(12) United States Patent
Tuilier et al.

(10) Patent No.: US 9,949,128 B2
(45) Date of Patent: Apr. 17, 2018

(54) METHOD OF PERSONALIZING A SECURITY ELEMENT COOPERATING WITH AN APPARATUS

(71) Applicant: GEMALTO SA, Meudon (FR)

(72) Inventors: Edmond Tuilier, La Ciotat (FR); Jean-Rémi Quiriconi, La Ciotat (FR)

(73) Assignee: GEMALTO SA, Meudon (FR)

( * ) Notice: Subject to any disclaimer, the term of this patent is extended or adjusted under 35 U.S.C. 154(b) by 221 days.

(21) Appl. No.: 14/379,832

(22) PCT Filed: Feb. 21, 2013

(86) PCT No.: PCT/EP2013/053465
§ 371 (c)(1),
(2) Date: Aug. 21, 2014

(87) PCT Pub. No.: WO2013/124358
PCT Pub. Date: Aug. 29, 2013

(65) Prior Publication Data
US 2015/0038117 A1 Feb. 5, 2015

(30) Foreign Application Priority Data

Feb. 21, 2012 (EP) .................................... 12305197

(51) Int. Cl.
*H04M 1/66* (2006.01)
*H04W 12/08* (2009.01)
(Continued)

(52) U.S. Cl.
CPC ............ *H04W 12/08* (2013.01); *G06F 21/62* (2013.01); *H04W 4/001* (2013.01); *H04W 4/003* (2013.01);
(Continued)

(58) Field of Classification Search
CPC .............. G06Q 20/3552; G06Q 20/355; H04L 63/0853
(Continued)

(56) References Cited

U.S. PATENT DOCUMENTS 5,557,679 A 9/1996 Julin et al.
2005/0207562 A1 9/2005 Nachef et al.
(Continued)

FOREIGN PATENT DOCUMENTS

FR 2821231 A1 8/2002
FR 2908209 A1 5/2008
(Continued)

OTHER PUBLICATIONS

International Search Report (PCT/ISA/210) dated May 21, 2013, by the European Patent Office as the International Searching Authority for International Application No. PCT/EP2013/053465.

*Primary Examiner* — Thomas Lett
(74) *Attorney, Agent, or Firm* — Buchanan Ingersoll & Rooney PC

(57) ABSTRACT

The invention relates to a method of personalizing a security element cooperating with an apparatus. This personalization includes downloading data, which is related to a subscription to a network of a mobile radiotelephony operator, in the security element. The method further includes: (i) connecting the apparatus to a card reader; (ii) reading from the card operator data corresponding to at least one subscription to a network of a mobile radiotelephony operator; (iii) transmitting the operator data from the reader to an operator network; (iv) transmitting from the operator network to a subscription manager a request for transferring data related to the subscription to the mobile radiotelephony operator network; and (v) transmitting, from the manager to the
(Continued)

security element, the data related to the subscription to the mobile radiotelephony operator network.

7 Claims, 1 Drawing Sheet

(51) Int. Cl.
    *H04W 4/00*     (2018.01)
    *H04W 8/18*     (2009.01)
    *G06F 21/62*     (2013.01)
    *H04W 8/20*     (2009.01)

(52) U.S. Cl.
    CPC .......... *H04W 8/183* (2013.01); *H04W 8/205* (2013.01); *G06F 2221/2141* (2013.01); *H04W 4/008* (2013.01)

(58) Field of Classification Search
    USPC .......................................................... 455/411
    See application file for complete search history.

(56) References Cited

U.S. PATENT DOCUMENTS

| | | | |
|---|---|---|---|
| 2006/0111147 A1* | 5/2006 | Lan | .................. H04M 1/72525 |
| | | | 455/558 |
| 2009/0124287 A1 | 5/2009 | Weiss et al. | |
| 2009/0217348 A1 | 8/2009 | Salmela et al. | |
| 2010/0093334 A1 | 4/2010 | Bertin et al. | |

FOREIGN PATENT DOCUMENTS

| | | |
|---|---|---|
| WO | WO 93/07697 A1 | 4/1993 |
| WO | WO 2007/006535 A1 | 1/2007 |
| WO | WO 2009/103623 A2 | 8/2009 |

\* cited by examiner

METHOD OF PERSONALIZING A SECURITY ELEMENT COOPERATING WITH AN APPARATUS

The field of the invention is that of telecommunications and concerns in particular a method for personalising a security element cooperating with an apparatus such as a machine. Personalisation of a security element means the downloading of confidential data into the security element for diversifying it from other security elements and thereby assuring unicity of the secrets and identifiers loaded into each security element.

The security element is typically a SIM card (in GSM) or USIM card (in UMTS), generically referred to as UICC, intended to cooperate with an apparatus. The security element cannot necessarily be extracted from the apparatus, like a conventional SIM card, and may be integral with this apparatus (or the modem part forming part of this apparatus). This security element may also be in the form of an integrated circuit soldered in an apparatus (or cooperating with an apparatus), in the case of M2M (machine to machine) applications, the security element then being referred to as e-UICC and fulfilling the same functions as a conventional UICC card. Here "functions" means the authentication of the subscriber to a telecommunications network, for example cellular, enabling him to establish, in a secure manner, communications with elements connected to the network of the operator. Such a security element in particular contains an IMSI (International Mobile Subscriber Identity) and Ki key enabling it to authenticate itself on the network of the operator. The IMSI and Ki key are, in the remainder of this description, data relating to a subscription to a network of a mobile telephony operator and form part of the security elements of the subscription.

The apparatus may be a telecommunication terminal such as a mobile telephone, a digital tablet or a smartphone. It may also be a more bulky machine, such as a car, a meter (gas or electricity for example) or a drinks dispenser, which are in this case equipped with a communication modem (GSM or UMTS).

Normally, when a person wishes to take out a subscription with an operator, he goes to a sales centre of the operator which, after having requested from him documents relating to his bank account and his place of residence, gives him a UICC card. The UICC card already contains the identifiers enabling him to connect almost immediately to the network of the operator (the HLR of the operator is provided in advance with these identifiers).

The drawback of this solution is that it requires the user to travel to a point of sale of subscriptions of the mobile telephony operator.

In addition, this solution is not applicable in the case where the security element is embedded fixedly in an apparatus, since the security element cannot be inserted in the apparatus since it is integral therewith.

To this end, the present invention proposes a method for easily personalising a security element by means of data relating to a subscription to a mobile telephony operator.

According to the invention, this method consists of:
 i—connecting the apparatus to a card reader;
 ii—reading in the card operator data corresponding to at least one subscription to a network of a mobile telephony operator;
 iii—transmitting these operator data from the reader to an operator network;
 iv—transmitting from the operator network to a subscription manager a request to transfer the data relating to the subscription to the mobile telephony operator network;
 v—transmitting from the manager to the security element the data relating to the subscription to the mobile telephony operator network.

Advantageously, step -v- consists of transmitting the data relating to the subscription to the mobile telephony operator network by means of the card reader.

Alternatively, step -v- consists of transmitting the data relating to the subscription to the mobile telephony operator network by means of the Internet to which the card reader is connected by means of a computer.

Step -ii- is preferentially preceded by a step of checking a security code.

In an advantageous embodiment of the method according to the invention, step -i- is implemented by an installer and the method consists of offering to the installer several different subscriptions, the installer choosing, by means of the man-machine interface of the card reader, one of the subscriptions offered.

The method according to the invention can also be implemented by a card retailer or an end user of the machine and the security code then corresponds to a transfer code of a mobile telephony operator.

The security element is advantageously an e-UICC.

Other features and advantages of the invention will emerge from a reading of the following description of two embodiments of the invention, given by way of illustration and non-limitatively, and the accompanying figures depicting two systems implementing the method according to the present invention, in which.

Figure 1:
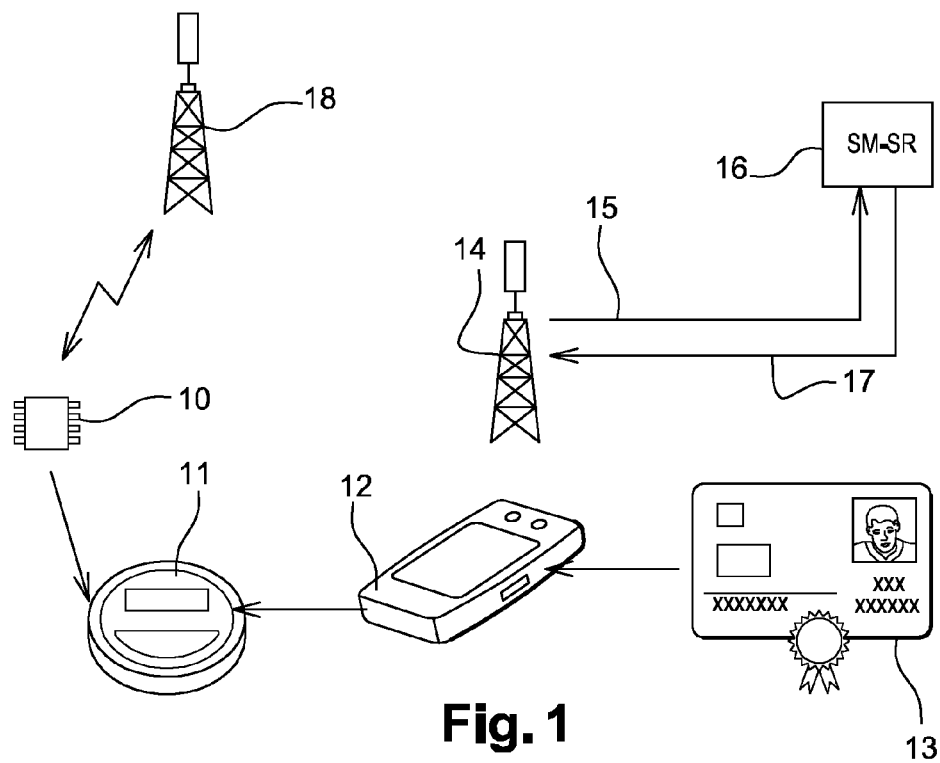
FIG. 1 shows a personalisation system according to the invention where the personalisation of a security element is performed by an integrator.

The personalisation system of FIG. 1 is intended to personalise a security element 10, here consisting of an e-UICC cooperating with a machine or an apparatus 11. The apparatus 11 consists here of an electricity or gas meter integrating the e-UICC. The personalisation of the meter 11 is here done by an integrator or installer having a personal card 13. Typically, this integrator physically installs the meter 11 at the home of a private individual or in a company and the e-UICC does not comprise any data enabling it to connect to a network of a mobile telephony operator.

The personalisation of the security element 10 consists initially of connecting the meter 11 to a card reader 12 or to an apparatus containing a card reader 12 in which the integrator can insert his personal card 13. The card 13 is a PKI card for authenticating its bearer by means of a unique certificate, supplied by his company or by an operator. The card 13 of the integrator may comprise a plurality of sets of operator data offering authorisation to contact subscription managers (SM-SR, as will be described hereinafter) of the operator. This authorisation will give the possibility of downloading the IMSI/Ki sets corresponding to subscriptions of several mobile telephony operators. This card 13 may also contain directly the IMSI/Ki sets corresponding to subscriptions of several operators.

After having optionally verified a security code (for example a four-digit code) entered by the integrator on the keypad of the reader 12, either the reader 12 reads in the card 13 operator data corresponding to at least one subscription to a network of a mobile telephony operator, or it interrogates the card 13 in order to obtain authorisation to contact the SM-SR subscription manager of the selected operator.

As indicated previously, several operators may be provisioned in the card 13, each provisioned operator being able to contain an SM-SR contact link or the subscription itself. The integrator can then choose the operator with the network with which the e-UICC can enter into communication. In another embodiment, the integrator has several cards, each containing data of a single operator. By way of example, in France, the integrator will thus have one card for the Orange operator, another for the Bouygues operator, another for the Free operator and a last one for the SFR operator. Another example, in France an integrator will have a single card comprising the 4 IMSI/Ki of Bouygues, Orange, SFR and Free.

The reader 12 comprises a modem capable of transmitting the operator data read in the card 13 to an operator network 14. This reader 12 typically comprises an M2M interface, that is to say an e-UICC and an associated modem. The operator network 14 may be any one.

During a step 15, the operator network 14 transmits, to a subscription manager 16 (denoted SM-SR, standing for Subscription Management—Subscription Routing), a request to transfer data relating to the subscription chosen.

The subscription manager 16 then transmits, during a step 17, the data relating to the chosen subscription, to the operator 14. As indicated previously, these data correspond to a complete operator profile, including in particular the IMSI/Ki pair to be loaded into the security element 10 so that it can communicate with the network of the chosen operator.

The data relating to the chosen subscription are transmitted by means of the reader 12, which receives these data from the operator 14. The data received by the reader 12 is then written in the security element 10. The latter can then communicate with the chosen operator network 18.

In the case where the operator profiles are preloaded in the card 13, the process detailed above remains valid, an operation performed upstream by the integrator before taking its turn on site to install the equipment.

Figure 2:
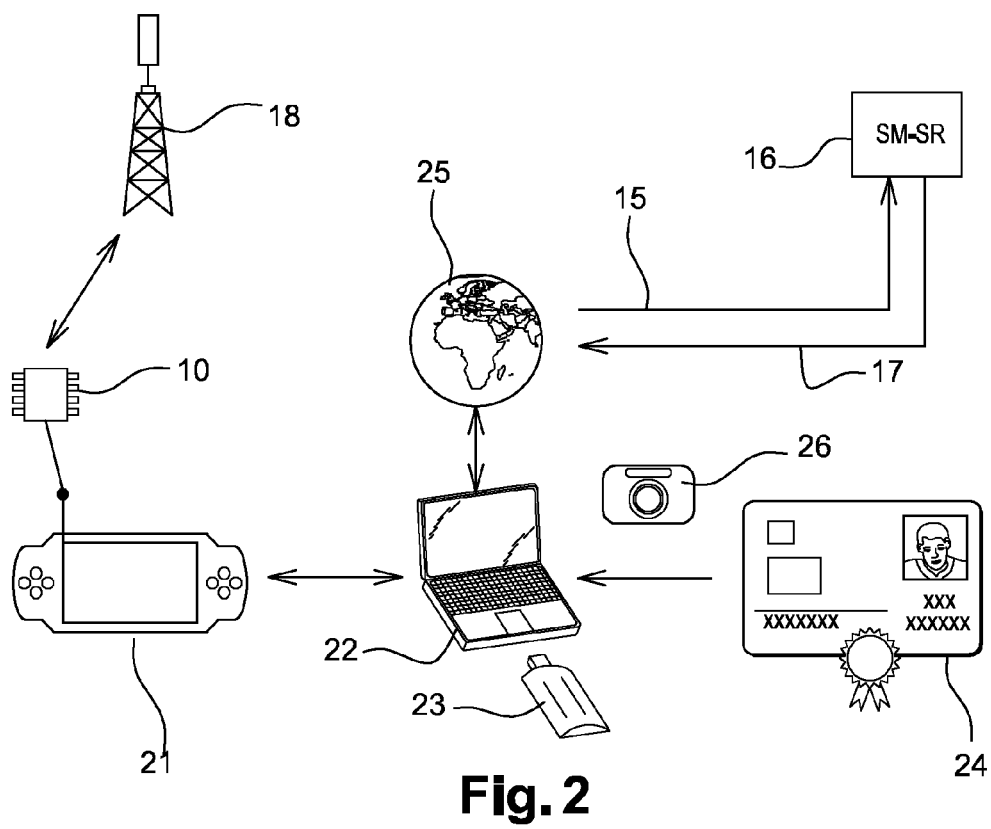
FIG. 2 shows a personalisation system according to the invention where the personalisation of a security element is performed by an end user or equipment vendor.

In a second embodiment of the present invention, depicted in FIG. 2, the personalisation of a security element is done by an end user or an equipment vendor.

This embodiment is intended for a purchaser of an apparatus, such as a games console 21, provided with an e-UICC 10. When it is purchased, as before with reference to FIG. 1, the e-UICC 10 does not contain any data enabling it to be authenticated with an operator network 18.

The personalisation of the security element 10 takes place as follows, when it is used by the end user (typically the purchaser of the console 21): the end user purchases, with the console 21 or separately, a card 24 comprising operator data corresponding to a unique subscription link to a network of a mobile telephony operator. He therefore preferentially has the choice of the operator who will manage his games console 21. Once at home, the user inserts his card 24 in a reader 23 connected to a computer 22 or integrated in the latter. The user, equipped with a CD 26 for installing ad hoc software, then connects by means of the Internet 25 to the subscription manager 16 (by means of a URL address) and transmits to it, during a step 15, the data relating to the subscription appearing in his card 24. A security code, previously supplied to the end user, may be requested of him so that this transfer takes place. The subscription manager 16 transmits to it in return, in secure form, the data relating to the subscription chosen (complete profile containing the IMSI/Ki pair). These data pass through the computer and the console 21 in order to be written in the e-UICC 10. This e-UICC 10 is then able to connect to the network 18 of the operator whose data appear in the card 24.

A physical relationship between the user and his operator is thus established by a card 24. The card 24 thereby represents the relationship that the user has with his operator, which has advantages with regard to marketing: the user holds, at the time of his purchase, a card of the operator that he will have chosen. The user therefore has the impression of being in the same situation as when he takes out a subscription with an operator in order to come into possession of a SIM card that he inserts in his equipment, whereas the e-UICC that he personalises in the context of the present invention cannot be extracted from the equipment 21 that contains it.

When the invention is implemented by a vendor of equipment, such as consoles 21 for example, the method according to the invention takes place as described previously with reference to FIG. 2, with the following differences: the card 24 of the retailer comprises several subscription links to a single operator or several subscription links to different operators. Once his card 24 is inserted in the reader 23, he enters a confidential code that has been provided to him by the operator chosen by the end user. By means of this code, the operator data corresponding to a subscription are transferred via the Internet 25 to the SM-SR 16, which returns to him the complete profile (including the IMSI/Ki pair) for personalising the e-UICC 10. This profile is then loaded in the e-UICC 10 of the equipment 21 of the user.

In the two situations mentioned with reference to FIG. 2, the security code entered by the end user or the retailer corresponds in practice to a transfer code of a mobile telephony operator profile. This transfer code is for single use for each subscription loaded in the security element 10, so as to prevent a subscription being installed on several items of equipment. The operator is informed by the SM-SR 16 of the activation of a subscription and he can then provide the IMSI/Ki identifiers in his HLR.

The invention claimed is:

1. A method for personalising a security element embedded in an apparatus, said personalisation including downloading data, which relates to a subscription to a network of a mobile telephony operator, in said security element, comprising:
   i—connecting said apparatus to a card reader;
   ii—reading, from a card connected to said card reader, operator data corresponding to at least one subscription to a network of a mobile telephony operator;
   iii—transmitting said operator data from the reader to an operator network;
   iv—transmitting, from the operator network to a subscription manager, a request to transfer said data relating to the subscription to said mobile telephony operator network; and
   v—transmitting, from the subscription manager to said security element, the data relating to the subscription to said mobile telephony operator network.

2. The method according to claim 1, wherein step -v- comprises transmitting said data, relating to said subscription to said mobile telephony operator network, by means of said card reader.

3. The method according to claim 1, step -v- comprises transmitting said data, relating to said subscription to said mobile telephony operator network, by means of the Internet, to which said card reader is connected by means of a computer.

4. The method according to claim 1, wherein step -ii- is preceded by a step of verifying a security code.

5. The method according to claim 1, wherein step -i- is implemented by an installer and wherein it comprises offering to said installer several different subscriptions, said installer choosing, by means of a man-machine interface of said card reader, one of the subscriptions offered.

6. The method according to claim 1, wherein the method is implemented by a card retailer or an end user of said machine and wherein said security code corresponds to a transfer code of a mobile telephony operator.

7. The method according to claim 1, wherein said security element is fixedly attached to said apparatus.

* * * * *